S. L. SPENCER.
Potato-Planter.
No. 57,207.
Patented Aug. 14, 1866.
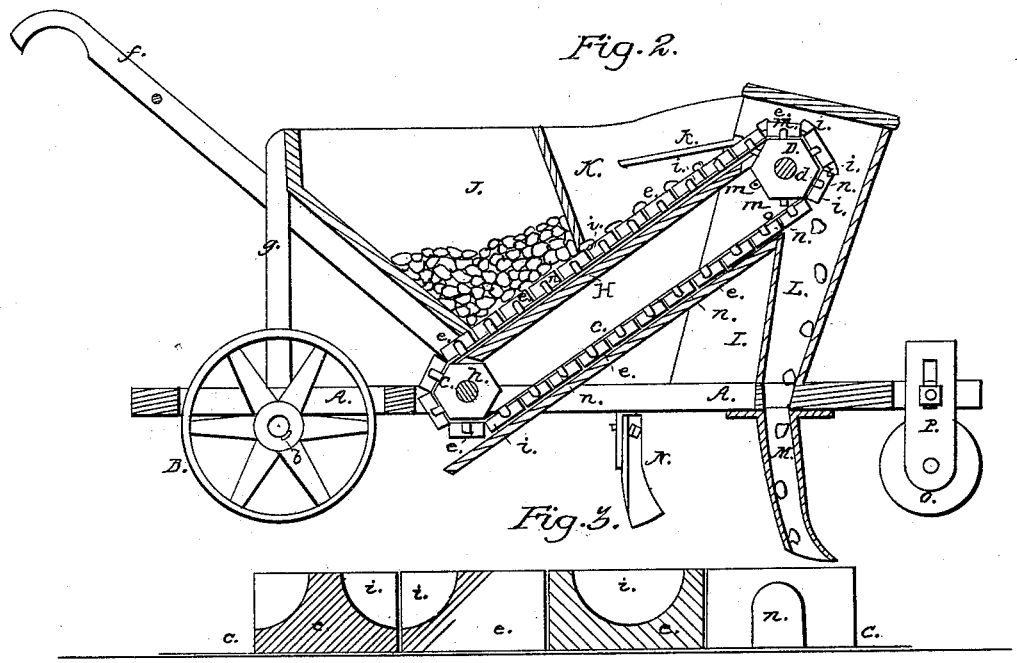
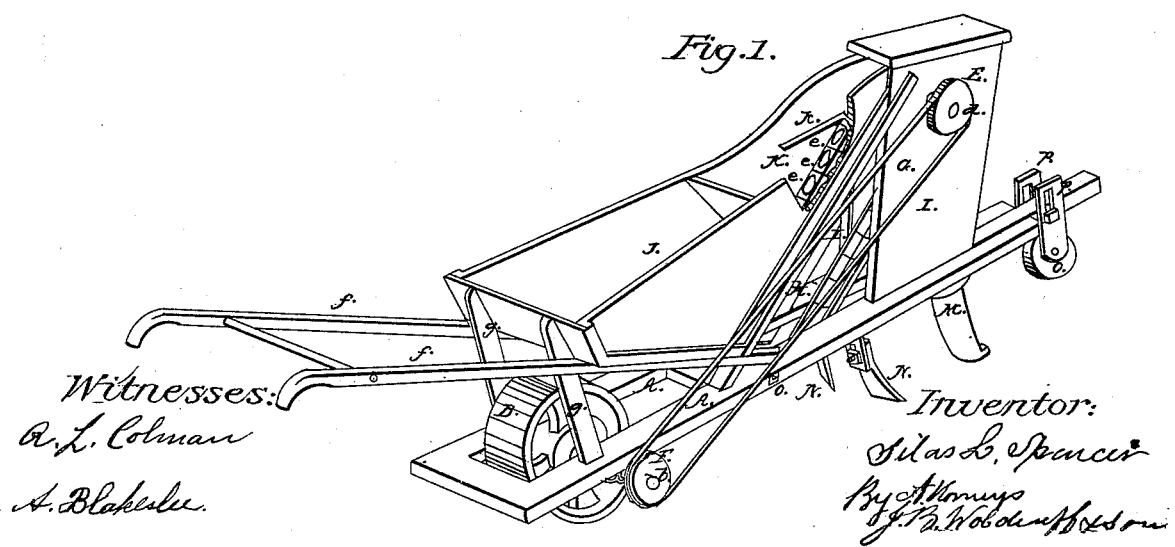
Witnesses:
R. L. Colman
A. Blakeslee
Inventor:
Silas L. Spencer
By Attorneys
J. B. Woodruff & Son

UNITED STATES PATENT OFFICE.

SILAS L. SPENCER, OF HOPEWELL CROSS-ROADS, MARYLAND.

IMPROVEMENT IN POTATO AND DRILL MACHINES.

Specification forming part of Letters Patent No. 57,207, dated August 14, 1866.

*To all whom it may concern:*

Be it known that I, SILAS L. SPENCER, of Hopewell Cross-Roads, in the county of Harford, State of Maryland, have invented certain new and useful Improvements in Drills for Planting Potatoes, Corn, Beans, and other Seeds; and I do hereby declare that the following is a full, clear, and exact description of the same, reference being had to the accompanying drawings, making a part of this specification, in which—

Figure 1 represents a perspective view of the potato-planter and seed-drill. Fig. 2 shows a longitudinal section through a side elevation. Fig. 3 shows an enlarged view of a section of the endless-belt boxes for dropping the potatoes or other seeds.

The object of my invention is to supply a very necessary implement for agricultural purposes, for saving time and labor in planting potatoes and other large seeds—as corn, beans, pease, and most kinds of bulbous plants and cereals—which it is desirable to grow in rows for cultivating.

My invention consists in the construction of the frame, the arrangement of double box or hopper for receiving the potatoes or other seeds to be planted, the mode of constructing the delivering-boxes, in combination with the endless belt and adjustable loop strike or scraper to prevent more seed being dropped than is required; also, the combination of the adjustable roller-drill point, covering-scrapers, and presser-roll.

To enable others skilled in the art to make and use my invention, I will describe it more fully, referring to the drawings and to the letters of reference marked thereon.

The frame A A is made of hard-wood plank, so shaped and framed together as to leave an opening in the rear end for the driving-wheel and pressure-roller B to be placed, it being supported on a shaft, $b$, in journal-boxes secured to the under side of the frame A A. Through the frame there is another long opening, in which is placed the lower roller, C, on which the endless belt $c\ c$ is supported, it having an inclination of about forty-five degrees, passing round the upper roller, D, which is hung on a shaft, $d$, on one end of which is a band-pulley, E, to drive it by connecting it with the pulley F on the shaft $b$ of the driving roller or wheel B by the band G. On the top of the frame A A, directly over the shaft of the driving-roller B, are placed vertical posts $g\ g$, to which the handles $f f$ are secured. They, with the inclined bottom board, H, and upright plank I I, form the frame for the seed boxes or hoppers J K.

On the endless chain or belt $c\ c$ are fastened the delivering cups or boxes $e\ e\ e\ e\ e$. They may be made of hard wood or cast of metal. The cavities $i\ i\ i$, in which the seed lodges, should be made in the ends of the blocks, one-half in each end, so that as the belt passes over the roller E, at the forward and elevated end of the hopper, the joint will open the cavities $i\ i\ i$, and thus insure the delivering of the potatoes, one piece at a time, or the requisite quantities of other smaller seeds, into the passage L, for being deposited through the drill-tube M, as seen in Fig. 2. For the purpose of preventing more than one piece of potato or more than a measure of other seeds from being delivered, I place a loop of iron, $k$, to act as a scraper or strike, to keep the seed back in the front end of the hopper K. This strike can be adjusted so as to admit nothing to be dropped which lies above the face of the delivering-boxes $e\ e\ e$.

There may be lugs placed on the inside of the endless belt $c\ c$, to fit into recesses in the rollers D and C, or pins $m\ m\ m$ in the rollers, with corresponding recesses $n\ n\ n$ in the belt and boxes, which act as cog or rack gear to insure the continuous movement of the dropping apparatus. If desirable, the band G may be dispensed with and the dropping apparatus put in motion by a cog-wheel connection between the driving-shaft $b$ and the shaft $d$ on the lower shaft, $h$.

For the purpose of keeping the band $c\ c$ at a proper tension, I have the boxes for the journals of the shaft $h$ made to slide longitudinally with the belt, and are held adjusted by the bolt and nut $o$ through the sides of the frame A A.

On the under side of the frame A A, back of the drill-tube M, are the covering-scrapers N N, made so as to be moved up or down, so as to cover the seed to any desired depth, and is pressed down by the roller B in the rear. Under the front end of the frame is placed a roller, O, in an adjustable frame, $p\ p$, for the purpose of regulating the depth of the planting.

In having the seed-potatoes placed in the hopper J, the partition $l$ prevents them from being worked forward by the action of the boxes *e e e*, and the forward hopper, K, being free of a quantity of seeds, enables the driver to see that each cavity has its supply of seed, so that no spaces will be left. If occasionally one of the cavities should fail to take its seed, the driver has a sufficient time to place the seed in it, so that uniform and perfect planting is always done.

Having thus fully described my invention, what I claim as new, and desire to secure by Letters Patent, is—

The arrangement of the double hopper J K and strike *k*, in combination with the delivering-boxes *e e e* in the opening-joints *i i i*, endless belt *c c*, rollers C D, driving mechanism E F, and frame A, constructed and operating in the manner herein described, for the purposes specified.

SILAS L. SPENCER.

Witnesses:
J. B. WOODRUFF,
SAMUEL HARRIS.